(12) United States Patent
Jo et al.

(10) Patent No.: US 9,436,331 B2
(45) Date of Patent: Sep. 6, 2016

(54) DISPLAY DEVICE

(71) Applicant: LG DISPLAY CO., LTD., Seoul (KR)

(72) Inventors: Young Woo Jo, Paju-si (KR); Jae Hun Jun, Seoul (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 14/338,967

(22) Filed: Jul. 23, 2014

(65) Prior Publication Data

US 2015/0029144 A1 Jan. 29, 2015

(30) Foreign Application Priority Data

Jul. 23, 2013 (KR) ........................ 10-2013-0086711

(51) Int. Cl.
*G06F 3/044* (2006.01)
(52) U.S. Cl.
CPC ..................... *G06F 3/044* (2013.01)
(58) Field of Classification Search
CPC ....................................................... G06F 3/044
See application file for complete search history.

(56) References Cited

U.S. PATENT DOCUMENTS

| | | | | |
|---|---|---|---|---|
| 6,879,367 B2* | 4/2005 | Ukita | ................... | G02F 1/1345 349/149 |
| 7,012,664 B2* | 3/2006 | Moon | ................ | G02F 1/13452 349/139 |
| 7,271,871 B2* | 9/2007 | Jen | ........................ | G02F 1/1345 349/149 |
| 7,714,815 B2* | 5/2010 | Kim | ..................... | G09G 3/3233 345/82 |
| 7,864,160 B2* | 1/2011 | Geaghan | ................ | G06F 3/044 345/173 |
| 8,970,537 B1* | 3/2015 | Shepelev | ................ | G06F 3/044 178/18.01 |
| 9,081,453 B2* | 7/2015 | Bulea | ..................... | G06F 3/044 |
| 9,110,546 B2* | 8/2015 | Kim | ........................ | G06F 3/044 |
| 9,122,361 B2* | 9/2015 | Shen | .................... | G06F 3/0418 |
| 2007/0080433 A1* | 4/2007 | Lai | ........................ | G02F 1/1345 257/666 |
| 2008/0246496 A1* | 10/2008 | Hristov | ................... | G06F 3/044 324/686 |
| 2008/0252608 A1* | 10/2008 | Geaghan | ................ | G06F 3/044 345/173 |
| 2010/0066700 A1 | 3/2010 | Mozdzyn | | |
| 2010/0156811 A1* | 6/2010 | Long | ........................ | G06F 3/044 345/173 |
| 2010/0309162 A1* | 12/2010 | Nakanishi | ............... | G06F 3/044 345/174 |
| 2010/0328248 A1* | 12/2010 | Mozdzyn | ................ | G06F 3/044 345/174 |
| 2011/0048812 A1* | 3/2011 | Yilmaz | .................... | G06F 3/044 178/18.06 |
| 2011/0048813 A1* | 3/2011 | Yilmaz | .................... | G06F 3/044 178/18.06 |
| 2011/0085122 A1 | 4/2011 | Fu et al. | | |
| 2011/0090170 A1* | 4/2011 | Lin | .......................... | G06F 3/044 345/174 |
| 2012/0218199 A1* | 8/2012 | Kim | ....................... | G06F 3/0412 345/173 |
| 2013/0043068 A1* | 2/2013 | Xie | ........................ | G06F 3/044 174/262 |
| 2013/0153391 A1* | 6/2013 | Liu | ......................... | G06F 3/044 200/600 |
| 2014/0078414 A1* | 3/2014 | Lee | ......................... | G06F 3/041 349/12 |

OTHER PUBLICATIONS

Office Action issued in corresponding United Kingdom Patent Application No. GB1412981.1, mailed Jan. 23, 2015, 6 pages.

* cited by examiner

*Primary Examiner* — Christopher E Leiby
(74) *Attorney, Agent, or Firm* — Brinks Gilson & Lione

(57) ABSTRACT

A display device is disclosed which includes: a first substrate; a second substrate disposed to face the first substrate; a plurality of touch electrodes formed in a fixed area of the first substrate; touch lines connected to the touch electrodes; and a driver disposed in an edge of the first substrate and configured to apply a voltage to the touch lines. The touch lines connected to the touch electrodes have the same resistance value.

15 Claims, 5 Drawing Sheets

DISPLAY DEVICE

The present application claims priority under 35 U.S.C. §119(a) to Korean Patent Application No. 10-2013-0086711 filed on Jul. 23, 2013, which is hereby incorporated by reference in its entirety.

BACKGROUND

1. Field of the Disclosure

The present application relates to a display device. More particularly, the present application relates to an in-cell touch display device adapted to enhance touch performance.

2. Description of the Related Art

In general, most electrical appliances include a variety of internal and/or external input devices. Each of the electrical appliances inputs commands through the input devices and performs a variety of functions corresponding to the input commands. The input devices are variously implemented according to input modes. Representative examples of the input devices, including a key pad, a mouse and etc., are being used. Recently, touch panels (TSPS) are being increasingly used as the input devices. The touch panel inputs the command by sensing a touch position of a contact object.

The touch panel is disposed on the surface of a display device, such as a cathode ray tube (CRT), a liquid crystal display (LCD) device, a plasma display panel (PDP), an electroluminescent (EL) device or others, in order to sense a touch position of a contact object. An input device using the touch panel can input a command from a user by enabling the user to touch a fixed position of the touch panel with a contact object, such as a finger, a stylus pen or others.

Such a touch panel is classified into an in-cell mode, an on-cell mode and an add-on mode according the combination structure with the liquid crystal panel. The in-cell touch panel is formed within the liquid crystal panel. The on-cell touch panel is formed in an upper layer of the liquid crystal panel. The add-on touch panel is disposed on an outer surface of the liquid crystal panel.

The in-cell touch panel uses a common electrode as a touch electrode. The common electrode used as the touch electrode is divided into a plurality of common electrodes. Such an in-cell touch panel charges the touch electrode with a square wave voltage and compares rising periods of a charging voltage of the touch electrode before and after a touch. The rising period corresponds to a period that the charging voltage of the touch electrode reaches to a previously set voltage.

However, touch line connected to the respective common electrodes, which are used as touch electrodes, must be different from one another in length according to positions of the divided common electrodes. A resistance deviation between the touch lines connected to the respective common electrodes must be generated. The resistance deviation causes touch deviations in accordance with positions of the divided common electrodes. Due to this, reliability of the in-cell touch panel must deteriorate.

BRIEF SUMMARY

Accordingly, embodiments of the present application are directed to a display device that substantially obviates one or more of problems due to the limitations and disadvantages of the related art.

The embodiments are to provide a display device that is adapted to reduce resistance deviations between touch lines which are connected to respective touch electrodes.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to a general aspect of the present embodiment, a display device includes: a first substrate; a second substrate disposed to face the first substrate; a plurality of touch electrodes formed in a fixed area of the first substrate; touch lines connected to the touch electrodes; and a driver disposed in an edge of the first substrate and configured to apply a voltage to the touch lines. The touch lines connected to the touch electrodes have the same resistance value.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated herein and constitute a part of this application, illustrate embodiment(s) of the present disclosure and together with the description serve to explain the disclosure. In the drawings.

DETAILED DESCRIPTION OF THE EMBODIMENTS

Figure 1:
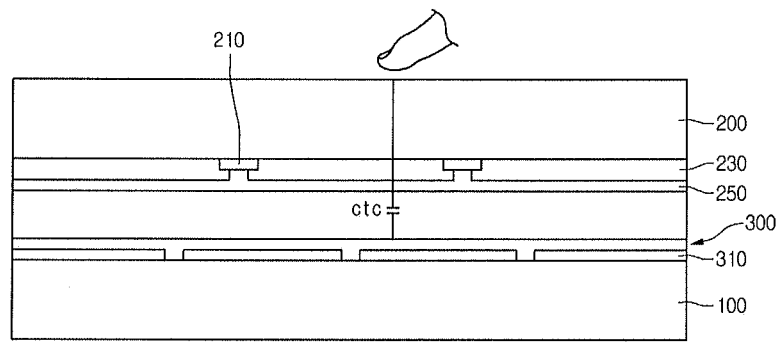
FIG. 1 is a sectional view showing a display device according to a first embodiment of the present disclosure.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device may be expressed to be exaggerated for the sake of convenience in the drawings. Wherever possible, the same reference numbers will be used throughout this disclosure including the drawings to refer to the same or like parts.

Figure 2:
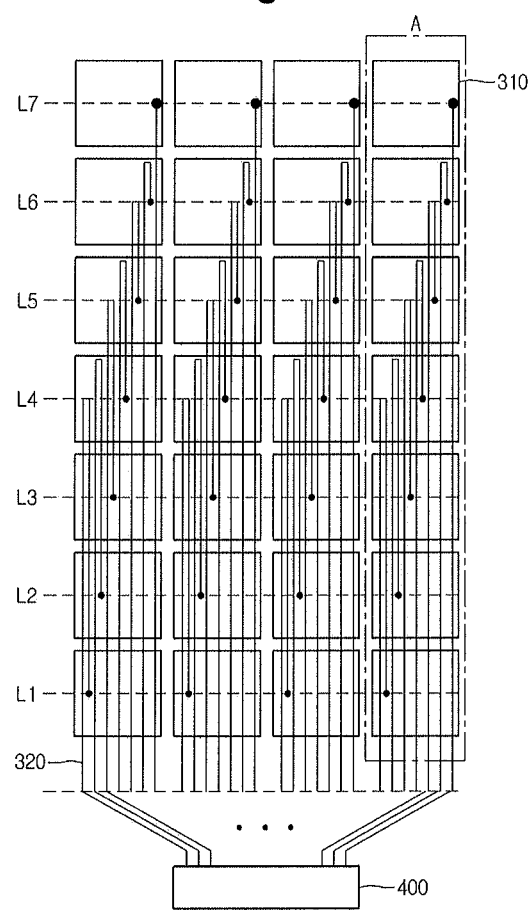
FIG. 2 is a planar view showing touch lines connected to touch electrodes of a display device according to a first embodiment of the present disclosure.
Figure 3:
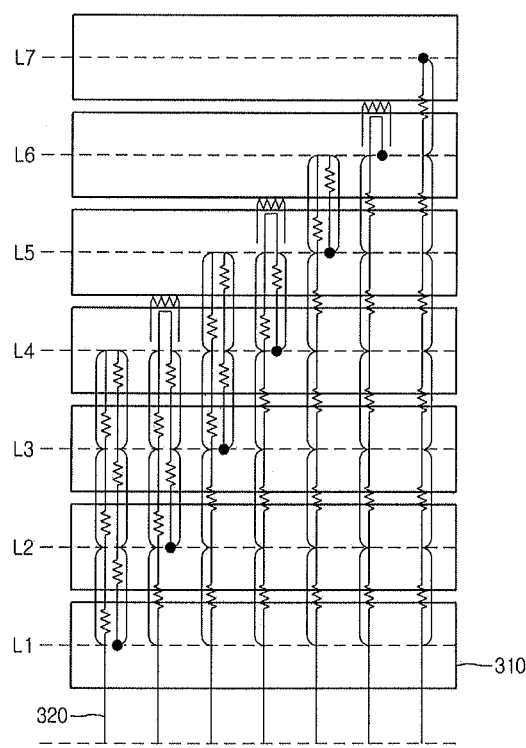
FIG. 3 is an enlarged planar view largely showing a part of FIG. 2.
Figure 4:
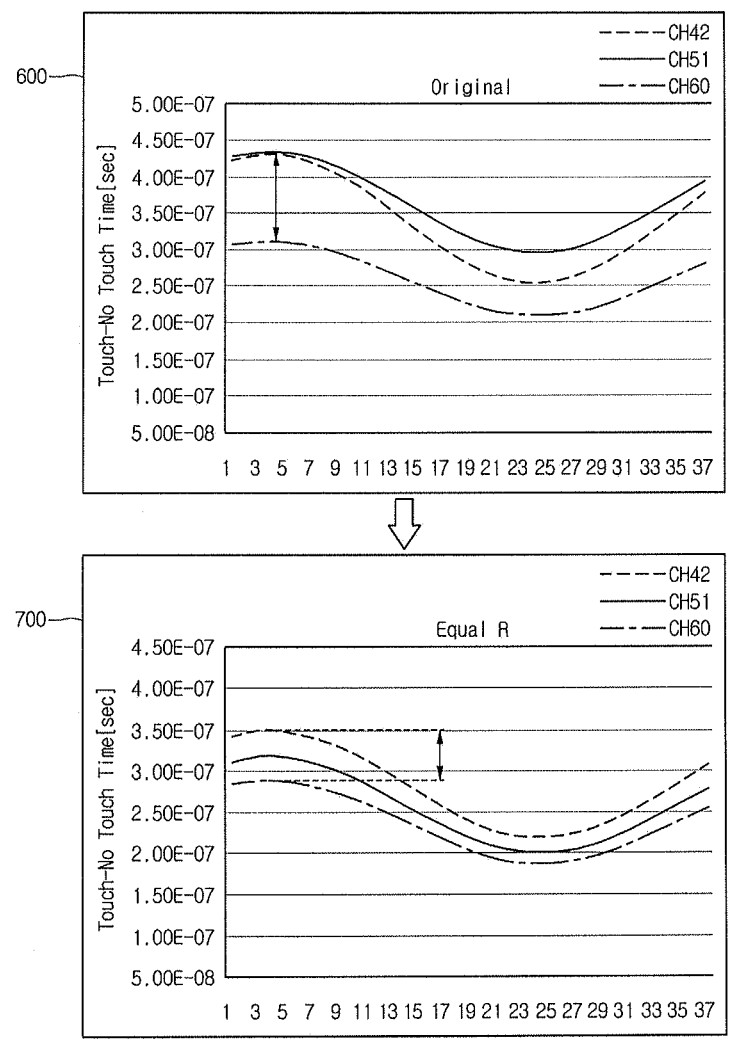
FIG. 4 is a data sheet illustrating experimental results of a display device according to a first embodiment of the present disclosure.

FIG. 1 is a sectional view showing a display device according to a first embodiment of the present disclosure. FIG. 2 is a planar view showing touch lines connected to touch electrodes of a display device according to a first embodiment of the present disclosure. FIG. 3 is an enlarged planar view largely showing a part of FIG. 2. FIG. 4 is a data sheet illustrating experimental results of a display device according to a first embodiment of the present disclosure.

Referring to FIGS. 1 through 3, a display device according to a first embodiment of the present disclosure includes a first substrate 100 and a second substrate 200 disposed to face the first substrate 100. The display device further includes a plurality of touch electrodes 310 formed in a fixed area of the first substrate 100, touch lines 320 connected to the respective touch electrodes 310, and a driver 400 disposed in an edge of the first substrate 100 and commonly connected to the touch lines 320.

The first substrate 100 can be formed in a rectangular plate shape. Also, the first substrate 100 can be formed from one of transparent glass and a transparent plastic material. Moreover, the first substrate 100 can be one of a rigid plate or a flexible plate. A pixel array 300 configured with a plurality of pixels (not shown), which is used to drive a liquid crystal layer and sense a touch of one of a user's finger and a pen, can be formed on the first substrate 100.

The pixel array 300 further includes data lines (not shown) formed on the first substrate 100 and gate lines (not shown) formed to cross the data lines. The plurality of pixels can be defined by the data lines and the gate lines crossing each other.

Each of the plural pixels includes a common electrode 310, a pixel electrode (not shown), a storage capacitor (not shown) and a thin film transistor (not shown). The thin film transistor is switched by a scan signal applied through the respective gate line and transfers a data voltage applied from the respective data line to the pixel electrode.

The pixel electrode applies the data voltage to the pixel (i.e., a liquid crystal cell), and the common electrode 310 applies a common voltage to the pixel (i.e., the liquid crystal cell). An electric field is formed by the data voltage and the common voltage, which are applied to the pixel (i.e., the liquid crystal cell). The liquid crystal layer (i.e., the liquid crystal cell) is driven by the electric field and allows images to be displayed.

The structure of the common electrode 310 corresponds to a subject matter of the embodiment of the present disclosure. As such, the data lines, the gate lines, the thin film transistors and the pixel electrodes are omitted in the drawings.

The second substrate 200 can be disposed to face the first substrate 100. Also, the second substrate 200 can be formed in the same shape as the first substrate 100. Moreover, the second substrate 200 can be formed from one of glass and a plastic material. Such a second substrate 200 can become one of a rigid plate and a flexible plate.

A black matrix 210 defining pixel regions opposite to the plurality of pixels can be disposed on a lower surface of the second substrate 200. Also, red, green and blue color filters 230 are arranged in the lower surface of the second substrate 200. The red, green and blue color filters 230 are formed in the pixel regions, which are defined by the black matrix 210. Moreover, an overcoat layer 250 is formed in such a manner as to cover the black matrix 210 and the color filters 230. The overcoat layer 250 planarizes the lower surface of the second substrate 200.

In the embodiments of the present disclosure, the common electrode 310 can be used a touch electrode. In detail, the common electrode 310 performed the natural function in a display interval when the images are displayed, and is used as the touch electrode sensing a touch of a user in a non-display interval when any image is not displayed.

A variation of a touch capacitance Ctc is formed between the second substrate 200 and the common electrode 210, which correspond to each pixel, by a touch of a user. The variation of the touch capacitance Ctc caused by the touch is sensed through a sensing driver. As such, a sensed touch position is output to an exterior.

In order to sense x-axis and y-axis coordinates on a touch screen, the common electrodes 310 each formed in each of the pixels are arranged in such a manner as to be separate from one another.

For convenience of explanation, the disclosure will refer the common electrodes as 'touch electrodes'. The touch electrodes will be referred to as the same number as the common electrodes.

As shown in FIGS. 2 and 3, the touch electrode 310 according to a first embodiment of the present disclosure is formed in such a manner as to be divided into a plurality of regions. The touch electrodes 310 can be arranged in a matrix of n×m. For example, the touch electrodes 310 can be arranged in a matrix of 4×7, but the present disclosure is not limited to this. In other words, arrangement of the touch electrodes 310 can be modified in a variety of structures. Such touch electrodes 310 can be formed from a transparent conductive material such as indium-tin-oxide ITO.

Touch lines 320 extending from the driver 400 are connected to the respective touch electrodes 310. The touch electrodes 310 can be arranged along first through seventh lines L1~L7 which gradually go away from an adjacent position to the driver 400.

All the touch lines 320 connected to the respective touch electrodes 310 which are arranged in the first through seventh lines L1~L7 can be formed to have the same resistance value. To this end, all the touch lines 320 connected to the respective touch electrodes 310 which are arranged in the first through seventh lines L1~L7 can be formed to have the same length. Differences between the touch lines connecting the driver 400 with the touch electrodes which are arranged in the first line L1 are quite small in length. As such, it can be considered that any length difference is not generated between the touch lines 310 reaching from the driver 400 to the touch electrodes which are arranged in the first line L1.

The touch lines 320 connected to the touch electrodes close to the driver 400 can overlap with the touch electrodes 310 far apart from the driver 400. For example, the touch lines 320 connected to the touch electrodes 310 which are arranged in the first line L1 can be formed in such a manner as to overlap with the touch electrodes which are arranged in the second through fourth lines L2~L4.

The touch lines 320 connected to the touch electrodes 310 in the first line L1 can be formed in a line shape overlapping with the touch electrodes 310 which are arranged in the first and fourth lines L1~L4. In detail, the touch lines 320 connected to the touch electrodes 310 in the first line L1 can be formed in such a manner as to extend from the driver 400 to an edge of the touch electrodes 310 in the fourth line L4 and then return to the touch electrodes 310 in the first line L1. The touch lines 320 connected to the touch electrodes 310 in the first line L1 are insulated from the touch electrodes 310 in the other lines L2~L7 in the exception with the first line L1.

Similarly, the touch lines 320 connected to the touch electrodes 310 in the second line L2 can be arranged in such a manner as to overlap with the touch electrodes 310 in the third and fourth lines L3 and L4. The touch lines 320 connected to the touch electrodes 310 in the third line L3 can be arranged in such a manner as to overlap with the touch electrodes 310 in the fourth and fifth lines L4 and L5.

The touch lines 320 connected to the touch electrodes 310 in the fourth line L4 can be arranged in such a manner as to overlap with the touch electrodes 310 in the fifth line L5. The touch lines 320 connected to the touch electrodes 310 in the fifth line L5 can be arranged in such a manner as to overlap with the touch electrodes 310 in the sixth line L6.

The touch lines 320 connected to the touch electrodes 310 in the sixth and seventh lines L6 and L7 can be formed without overlapping with other touch electrodes 310 which are far apart from them.

The touch lines 320 connected to the touch electrodes 310 in the sixth line L6 can be formed in a shape of extending from the driver 400 to a far edge of the respective touch electrode and returning to the central line of the respective touch electrode.

The touch lines connected to the touch electrodes 310 in the seventh line L7 can extend from the driver 400 to the respective touch electrodes in the shortest distance (or course). As such, the touch lines 320 connected to the touch electrodes 310 in the seventh line L7 can be formed in the same length as the other touch lines 320 connected the touch electrodes 310 in the first through sixth lines L1~L6.

If the touch line 320 connected to the touch electrode 310 in the seventh line L7 has a resistance corresponding '6R', the touch lines 320 connected to the touch electrodes 310 in the first line L1 can be formed in such a manner as to make a round trip to other touch electrodes being further apart than the respective touch electrodes from the driver 400 and further extend by a length corresponding to the resistance of 6R. Similarly, the touch lines 320 connected to the touch electrodes 310 in the second line L2 can be also formed in a length of further having a resistance of 5R by making a round trip to other touch electrodes 310 being further apart than the respective touch electrodes 310 from the driver 400.

In accordance therewith, all the touch lines 320 connected to the touch electrodes 310 in the first through seventh lines L1~L7 can have the resistance corresponding to '6R'.

Although it is described that the touch lines 320 connected to the touch electrodes 310 in the first line L1 are formed with overlapping with other electrodes 310 in the second through fourth lines L2 through L4, the present disclosure is not limited to this. In other words, the number of touch electrodes 310 overlapping with the touch line 320 can be varied with the length of the touch line 320.

FIG. 4 illustrates characteristics of a wiring resistance model 600 of the touch electrodes according to the related art and a wiring resistance model 700 of the touch electrodes according to the present disclosure with respect to touch noises. As seen from FIG. 4, it is evident that the deviations of the wiring resist model of the touch electrodes according to the related art with respect to the touch noises are comparatively large. On the contrary, the deviations of the wiring resist model of the touch electrodes according to the present disclosure with respect to the touch noises are quite small.

In this manner, the display device according to a first embodiment of the present disclosure allows the touch lines connected to the touch electrodes to be formed in the same length and to have the same resistance value. Therefore, the generation of a touch deviation at a touch due to the wiring resistance deviation can be prevented.

Also, the display device according to a first embodiment of the present disclosure utilizes a dead zone not used in the related art. As such, the touchlines can secure a sufficient length without any additional space.

Figure 5:
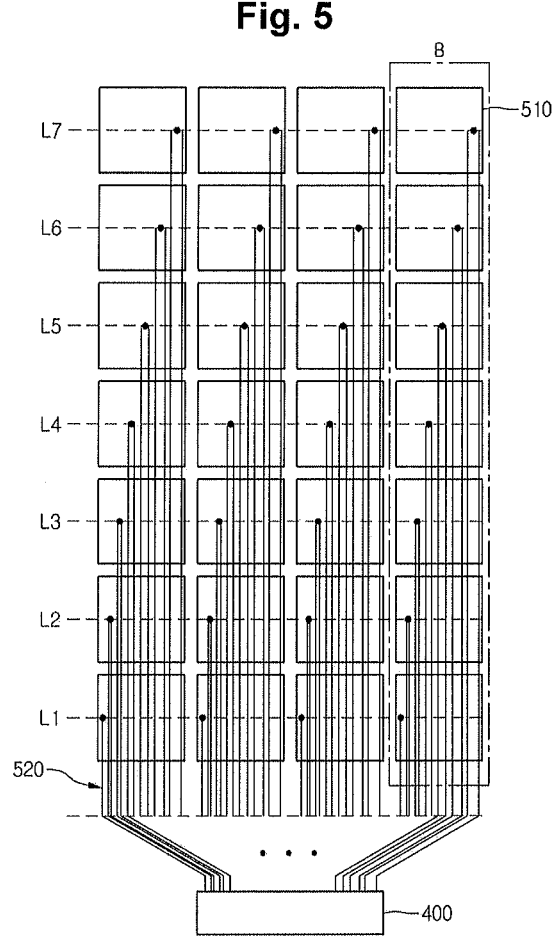
FIG. 5 is a planar view showing touch lines connected to touch electrodes of a display device according to a second embodiment of the present disclosure.
Figure 6:
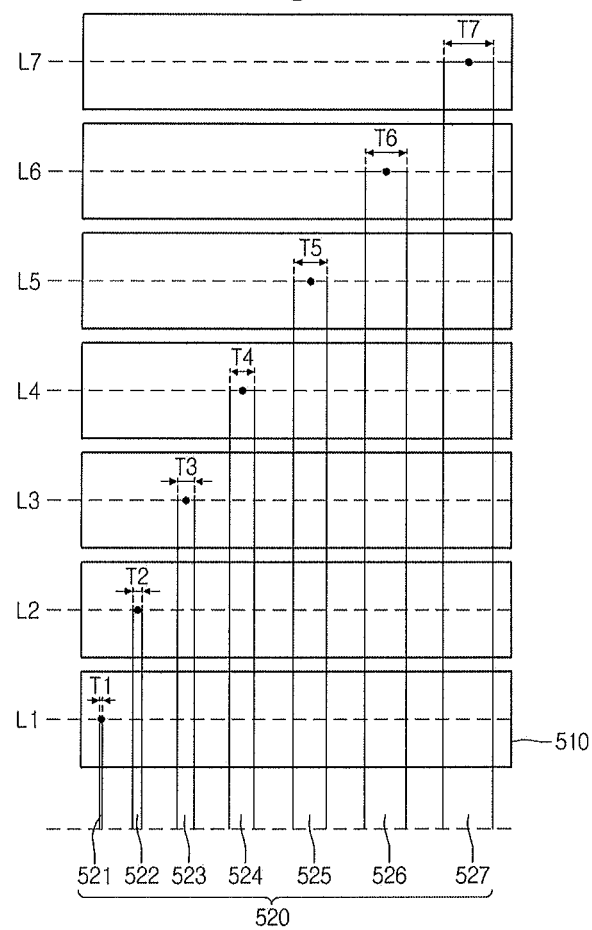
FIG. 6 is an enlarged planar view largely showing a part of FIG. 5.

FIG. 5 is a planar view showing touch lines connected to touch electrodes of a display device according to a second embodiment of the present disclosure. FIG. 6 is an enlarged planar view largely showing a part of FIG. 5. Principal components of the second embodiment having the same as those of the first embodiment with the exception of connection configuration of touch electrodes and touch lines will be omitted in the description.

As shown in FIGS. 4 and 5, the touch electrode 510 according to a second embodiment of the present disclosure is formed in such a manner as to be divided into a plurality of regions. The touch electrodes 510 can be arranged in a matrix of n×m. For example, the touch electrodes 510 can be arranged in a matrix of 4×7, but the present disclosure is not limited to this. In other words, arrangement of the touch electrodes 510 can be modified in a variety of structures. Such touch electrodes 510 can be formed from a transparent conductive material such as indium-tin-oxide ITO.

Touch lines 520 extending from the driver 400 are connected to the respective touch electrodes 510. The touch electrodes 510 can be arranged along first through seventh lines L1~L7 which gradually go away from an adjacent position to the driver 400.

All the touch lines 520 connected to the respective touch electrodes 510 which are arranged in the first through seventh lines L1~L7 can be formed to have the same resistance value. To this end, all the touch lines 520 connected to the respective touch electrodes 510 which are arranged in the first through seventh lines L1~L7 can be formed to have different thicknesses (or different widths) from one another.

Also, the touch lines 520 connected to the first through seventh lines L1~L7 can be formed in different lengths from one another. The further the touch electrodes 510 go away from the driver 400, the longer the touch lines 520 connected to the respective touch electrodes 510 can be formed.

The touch lines 520 connected to the touch electrodes 510, which are arranged in the second line L2, can be formed longer than the touch lines 520 connected to the touch electrodes 510 which are arranged in the first line L1. The touch lines 520 connected to the touch electrodes 510, which are arranged in the third line L3, can be formed longer than the touch lines 520 connected to the touch electrodes 510 which are arranged in the second line L2. The lengths of the touch lines 520 connected to the touch electrodes 510 which are arranged in the fourth through seventh lines L4~L7 can be set in the same manner as described above.

The further the touch electrodes 510 go away from the driver 400, the thicker (or wider) the touch lines 520 connected to the respective electrodes 510 can be formed. The touch lines 522 connected to the touch electrodes 510 which are arranged in the second line L2 can be formed thicker (or wider) than the touch lines 521 connected to the touch electrodes 510 which are arranged in the first line L1. In detail, the thickness T2 (or width) of the touch lines 522 connected to the touch electrodes 510, which are arranged in the second line L2, can be set to be about 2 times of the thickness T1 (or width) of the touch lines 521 connected to the touch electrodes 510 which are arranged in the first line L1.

The touch lines 523 connected to the touch electrodes 510, which are arranged in the third line L3, can be formed in a thickness T3 (or width) being about 3 times of the thickness T1 (or width) of the touchlines 521 connected to the touch electrodes 510 which are arranged in the first line L1. The touch lines 524 connected to the touch electrodes 510, which are arranged in the fourth line L4, can be formed in a thickness T4 (or width) being about 4 times of the thickness T1 (or width) of the touch lines 521 connected to the touch electrodes 510 which are arranged in the first line L1.

The touch lines 525 connected to the touch electrodes 510, which are arranged in the fifth line L5, can be formed in a thickness T5 (or width) being about 5 times of the thickness T1 (or width) of the touch lines 521 connected to the touch electrodes 510 which are arranged in the first line L1. The touch lines 526 connected to the touch electrodes 510, which are arranged in the sixth line L6, can be formed in a thickness T6 (or width) being about 6 times of the thickness T1 (or width) of the touch lines 521 connected to the touch electrodes 510 which are arranged in the first line L1.

Similarly, the touch lines 527 connected to the touch electrodes 510, which are arranged in the seventh line L7, can be formed in a thickness T7 (or width) being about 7 times of the thickness T1 (or width) of the touch lines 521 connected to the touch electrodes 510 which are arranged in the first line L1. Thickness differences (or width differences) between the touch lines 520 connected to the touch electrodes 510 which are arranged in the first through seventh lines L1~L7 can vary.

In this way, the display device according to a second embodiment of the present disclosure allows the touch lines connected to the touch electrodes to be formed in different thicknesses (or different widths) from one another and to have the same resistance value. Therefore, the generation of a touch deviation at a touch due to the wiring resistance deviation can be prevented.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
a first substrate;
a second substrate disposed to face the first substrate;
a plurality of touch electrodes arranged in a fixed area of the first substrate;
touch lines connected to the touch electrodes and extending into a display area of the display device; and
a driver disposed in an edge of the first substrate and configured to apply a voltage to the touch lines,
wherein the touch lines each include a first end connected to the driver and a second end connected to a corresponding one of the touch electrodes,
wherein some of the touch lines each include a bend portion such that each of the some of the touch lines extends from the first end, through the bend portion, to the second end and is connected to the corresponding one of the touch electrodes at the second end and that the second end is disposed closer to the driver than the bend portion is to the driver.

2. The display device of claim 1, wherein the touch lines connected to the touch electrodes are of the same length.

3. The display device of claim 1, wherein the touch line connected to the furthest touch electrode from the driver has the shortest length.

4. The display device of claim 3, wherein a part of the touch lines overlaps with the touch electrodes further apart than the respective touch electrode from the driver.

5. The display device of claim 1, further comprises a plurality of pixel formed on the first substrate, wherein each of the touch electrodes is within the respective pixel.

6. The display device of claim 5, wherein the touch electrodes comprise a transparent conductive material.

7. The display device of claim 6, wherein the touch electrodes are made of indium-tin-oxide ITO.

8. The display device of claim 1, wherein the first end and the bend portion define a first section, and the bend portion and the second end define a second section, the first section is connected to the second section.

9. The display device of claim 8, wherein the second section is shorter than the first section.

10. A display device comprising:
a first substrate;
a second substrate disposed to face the first substrate;
a plurality of touch electrodes arranged in a fixed area of the first substrate;
touch lines connected to the touch electrodes and extending into a display area of the display device; and
a driver disposed in an edge of the first substrate and configured to apply a voltage to the touch lines,
wherein the touch lines each include a first end connected to the driver and a second end connected to a corresponding one of the touch electrodes, and wherein the touch lines have different thicknesses and lengths such that the resistance of the touch lines from the first end to the second end is same.

11. The display device of claim 10, wherein the further the touch electrodes go away from the driver, the thicker the touch lines connected to the touch electrodes.

12. The display device of claim 11, wherein the further the touch electrodes go away from the driver, the longer the touch lines connected to the touch electrodes.

13. The display device of claim 10, wherein the touch lines connected to the touch electrodes have different widths from one another according to lengths of the touch lines.

14. The display device of claim 13, wherein the further the touch electrodes go away from the driver, the wider the touch lines connected to the touch electrodes are in width.

15. The display device of claim 14, wherein the further the touch electrodes go away from the driver, the longer the touch lines connected to the touch electrodes.

* * * * *